Sept. 21, 1948.  S. K. WILHELM  2,449,575
CUSHIONED KNOB
Filed Oct. 25, 1945

INVENTOR.
Seymour K. Wilhelm
BY
William F. Desmond
ATTORNEY

Patented Sept. 21, 1948

2,449,575

UNITED STATES PATENT OFFICE 2,449,575

CUSHIONED KNOB

Seymour K. Wilhelm, United States Army
Detroit, Mich.

Application October 25, 1945, Serial No. 624,631

6 Claims. (Cl. 74—557)

(Granted under the act of March 3, 1883, as
amended April 30, 1928; 370 O. G. 757)

The invention described herein, if patented, may be manufactured and used by or for the Government for governmental purposes, without the payment to me of any royalty thereon.

My invention relates to knobs for use on the steering wheels of such industrial vehicles as fork lift trucks to facilitate steering thereof and more particularly to a cushioned knob which eliminates or greatly reduces the possibility of injury to an operator due to his being struck by the steering knob when the steering wheel is rotated by backlash in the steering apparatus.

A certain amount of back-lash occurs in the steering apparatus of all vehicles whenever they are turned from a straight course, the amount and force of this back-lash being determined by the speed of the vehicle and the degree of turn made. Certain vehicles used for industrial purposes quite frequently are equipped with steering knobs on their steering wheels to facilitate steering these vehicles. Such knobs have the disadvantage that they may strike an operator's hand when the steering wheel turn under the influence of the back-lash. Accordingly, it is an object of my invention to provide a new and improved steering knob for the steering wheels of industrial or other vehicles which is cushioned to reduce the likelihood of an operator being injured if struck by the knob.

Another object of the invention is the provision of a new and improved steering knob which is fabricated from layers of sponge rubber wrapped around a core and bound together by a leather outer covering.

A further object of the invention is the provision of a new and improved steering knob which may be readily mounted on a steering apparatus or dismounted therefrom.

A still further object of the invention is the provision of a new and improved steering knob which is of simple and generally improved construction, yet durable and inexpensive to manufacture.

Figure 1:
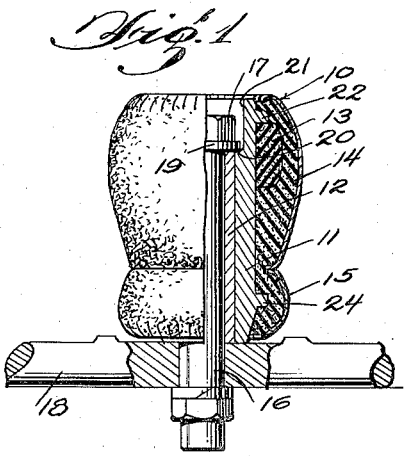
Figure 2:
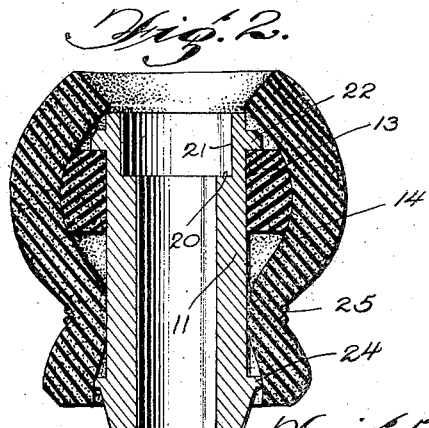
Figure 3:
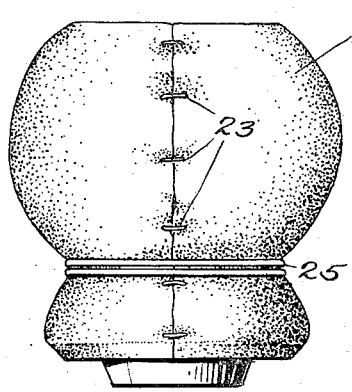
Figure 4:
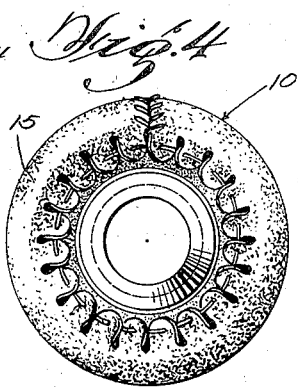
Figure 5:
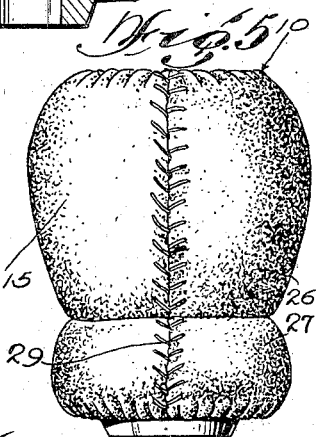
Figure 6:
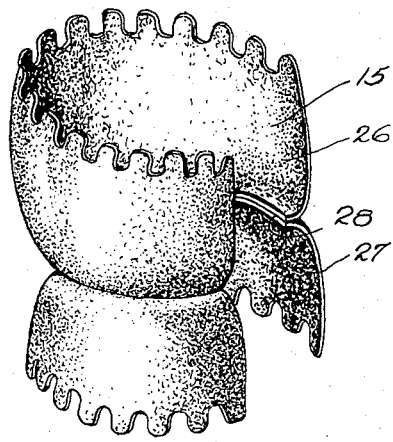

These and other objects of the invention will become apparent from the following description and accompanying drawings in which Fig. 1 is a side elevational view, partly in section, of my improved steering knob; Fig. 2 is a vertical cross-sectional view of the improved knob; Fig. 3 is a side elevational view of the knob with the outer cover removed; Fig. 4 is a top plan view of the knob showing the manner in which the upper edge of the outer cover is drawn together. Fig. 5 is a side elevational view showing the manner in which the ends of the outer covering are stitched together, while Fig. 6 is a perspective view of the outer covering, and Fig. 7 is a perspective view of the cushioning layers of the knob.

Referring to Figs. 1 and 2 of the drawing, it will be noted that the knob 10 comprises a spool shaped metallic core 11 rotatably mounted on a bushing 12 of suitable metal, such as brass, and padded with sponge rubber cushioning layers 13 and 14 which are protected from wear by a leather cover 15.

The knob 10 is rotatably mounted upon stud bolt 16 by means of the bushing 12 which is received on the bolt 16 and acts as a spacer between the head 17 of the bolt and the rim 18 of the steering wheel of the vehicle so that the bolt may be tightly secured to the rim without clamping the knob. A washer 19 is interposed between the head 17 of the bolt 16 and the upper end of the bushing and projects over the side of the bushing so that it will be engaged by the bottom 20 of a well 21, formed in the upper end of the core 11, when the latter is in position on the stud bolt thereby maintaining the knob on the bolt in free pivotal engagement therewith.

Figure 7:
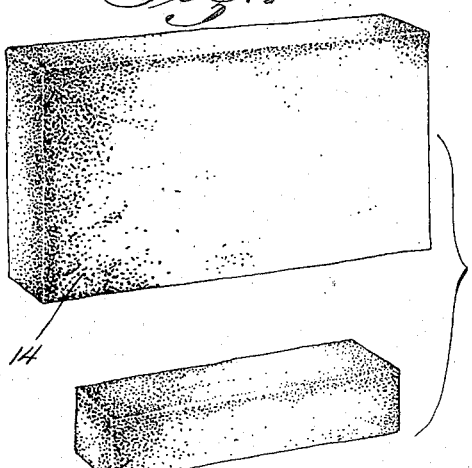

The cushioning elements of the knob consist of a relatively narrow strip of sponge rubber or other resilient material 13 overlaid by the relatively wide outer strip 14 of the same material, as shown in Figs. 2 and 7. Strip 13 encircles the core adjacent its upper end in engagement with a collar 22 adjacent the upper end of the core for holding the strip in position, as shown in Figs. 1 and 2. The ends of this strip are drawn together, thereby causing the strip to tautly engage the core, and they are secured together with heavy stitching. Encircling this is the rubber strip 14 of width sufficient to extend from a point adjacent the bottom of the core to its top. The ends of this strip are drawn together and stitched as indicated at 23 in Fig. 3, and at a point intermediate a collar 24 adjacent the lower end of the core and the lower edge of the narrow strip 13, the rubber strip 14 is drawn in by binding it with a binder such as the cord 25, as shown in Figs. 2 and 3, so that a bulbous enlargement is formed on the upper end of the knob.

An outer covering of the knob should consist of flexible long-wearing leather. In order to secure a close fit between the cover and the cushioning layers, the cover is made from two pieces 26 and 27 having longitudinally curved edges two of which are stitched together to form a seam 28 as indicated in Fig. 6. The outer edges of the strips are pinked to form scalloped edges also shown in Fig. 6.

In the final operation of the construction of a knob, the cover is placed about the unfinished knob with the seam 28 engaging in the drawn in part of the rubber cushioning layer 14, as indicated in Fig. 1, and the ends of the cover are drawn together and stitched with a base ball stitch, as indicated at 29 in Fig. 5. The top and bottom are drawn together by taking a stitch in each pinked ear along the top and bottom edges of the cover and drawing the threads taut so that these edges are drawn together as indicated in Figs. 1, 4 and 5, but a sufficient opening is left in the top for the head 17 of the stud bolts to pass through and the pinked ears along the bottom edge are drawn up only sufficiently to engage the sides of the lower tapered end of the core 11, as shown in Fig. 5.

While I have described one embodiment of my invention for the purpose of illustrating the same, it will be obvious that changes in the configuration and arrangement of parts, or the material of which they are constructed, may be made without departing from the spirit of the invention, and I do not desire to be limited except in accordance with the appended claims. It should also be obvious that a knob of the type herein described is adaptable for many uses. For example, in a vehicle such as a fork lift truck, it can be used not only on the steering wheel but also on the tilting lever and on the shifting and the raising and lowering levers.

I claim:

1. A cushioned steering wheel or similar knob comprising a rigid core, a relatively narrow first cushioning layer disposed about said core adjacent its upper end, a second cushioning layer disposed about said core and overlaying the first layer, a binder secured about said second layer adjacent the lower end thereof, said first layer and binder cooperating to produce a bulbous enlargement of the second layer and a wear resistant cover secured over said cushioning layers and stitched together to cause the same to conform to the shape of said second layer.

2. A cushioned steering wheel or similar knob comprising a rigid core, a relatively narrow first cushioning layer disposed about said core adjacent its upper end, a second cushioning layer disposed about said core and overlaying the first layer, a binder secured about said second layer adjacent the lower end thereof, said first layer and binder cooperating to produce a bulbous enlargement of said second layer and a wear resistant cover secured over said cushioning layers and stitched together to cause the same to conform to the shape of said second layer, said cover having scalloped upper and lower edges and a draw string for drawing said scalloped edges together to partially cover the open ends of the knob.

3. A cushioned steering wheel or similar knob comprising a rigid core, a relatively narrow first cushioning layer disposed about said core adjacent its upper end, a second cushioning layer disposed about said core and overlaying the first layer, a binder secured about said second layer adjacent the lower end thereof, said first layer and binder cooperating to produce a bulbous enlargement of the second layer and a wear resistant cover secured over said cushioning layers and stitched together to cause the same to conform to the shape of said second layer, said cover having scalloped upper and lower edges and a drawstring thread formed into a stitch in each scalloped ear drawn taut to cause said scalloped edges to be drawn inwardly toward each other partially to cover the ends of the second cushioning layer.

4. A cushioned steering wheel or similar knob comprising a rigid sleeve-like core provided with an annular ridge adjacent the upper and lower ends thereof, a relatively narrow first cushioning layer disposed about said core with its upper edge in engagement with the ridge adjacent the upper end of said core, a relatively wide second cushioning layer disposed about said core and overlaying said first layer and said core from top to bottom, a binder disposed about said second layer at a point intermediate the lower edges of said first layer and the ridge adjacent the lower end of said core, said first layer and binder cooperating to produce a bulbous enlargement of said second cushioning layer and a wear resistant cover secured over said cushioning layers and stitched to cause the same to conform to the shape of said second layer.

5. A cushioned steering wheel or similar knob comprising a rigid core provided with an annular ridge adjacent the upper end thereof, a relatively narrow first layer of resilient cushioning material annularly disposed about said core adjacent the upper end thereof in engagement with said ridge, a relatively wide second layer of cushioning material disposed about said core and first layer, and means for necking-in the lower portion of the second cushioning layer below the first cushioning layer to provide a bulbous gripping portion.

6. The method of making a cushioned knob, comprising wrapping a relatively narrow layer of resilient cushioning material annularly about a rigid core adjacent the upper end thereof, wrapping a relatively wide second layer of cushioning material about said first layer and said core, and circumferentially tying the lower portion of said second cushioning layer below said first cushioning layer, whereby a resilient bulbous gripping portion is formed.

SEYMOUR K. WILHELM.

REFERENCES CITED

The following references are of record in the file of this patent:

UNITED STATES PATENTS

| Number | Name | Date |
|---|---|---|
| 635,084 | Taylor | Oct. 17, 1899 |
| 1,984,033 | Ritchie | Dec. 11, 1934 |
| 1,984,293 | Webb | Dec. 11, 1934 |
| 2,134,020 | Anson | Oct. 25, 1938 |

FOREIGN PATENTS

| Number | Country | Date |
|---|---|---|
| 7,004 | Great Britain (1899) | Mar. 31, 1900 |